United States Patent Office 3,600,187
Patented Aug. 17, 1971

3,600,187
FAT SUPPLEMENT FOR FEED RATION, AND METHOD OF PREPARING SAME
Gilbert D. Elenbogen, Skokie, Ill., assignor to Vitamins, Inc., Chicago, Ill.
No Drawing. Continuation-in-part of application Ser. No. 426,390, Jan. 18, 1965. This application Mar. 14, 1968, Ser. No. 712,935
Int. Cl. A23k 1/00
U.S. Cl. 99—2      5 Claims

ABSTRACT OF THE DISCLOSURE

The method of making a fat supplement for animals in the form of a homogeneous emulsion of about 30 to 70% edible fat, about 10 to 30% nontoxic alkylene glycol, about 1 to 5% emulsifying agent and about 8–30% water whereby, a mixture of non-toxic alkylene glycol and water is formed, a portion of the emulsifying agent is added to the mixture, the remaining emulsifying agent is added to the edible fat, the water-glycol mixture and fat are mixed at about 100° F. to 140° F. and the resulting mixture is homogenized at a pressure of about 500 to 2000 pounds per square inch.

---

This application is a continuation-in-part of my copending application Ser. No. 426,390 filed Jan. 18, 1965, now abandoned.

This invention relates to a nutritive supplement for animals, and to the method for preparing the supplement. In its more specific aspect, this invention relates to such a nutritive supplement for carnivorous fur-bearing animals. In its still more specific aspect, this invention relates to a fat supplement for the feed ration for such fur-bearing animals, and the method for preparing the fat supplement for use in the ration.

It should be understood that this invention is directed in general to a fat supplement for animals including, for example, fur-bearing animals, dogs, cats and cattle. The invention is described hereinbelow, however, with specific reference to fur-bearing animals such as mink, fox, marten, otter and the like.

A number of fur-bearing animals are raised commercially on ranches or fur farms. The most popular of such fur farms are mink and fox, but there are a number of other fur farms such as marten, fisher, beaver, otter and the like. These animals are extremely sensitive in captivity and require a high degree of care. This is particularly true with respect to their diet which must be properly balanced, palatable and hygenic.

A proper and healthy diet is exceedingly important in maintaining the animals' health thereby minimizing the chances of disease, which could be fatal to a substantial portion of the herd. The invention will be described below in greater detail with respect to mink, but it should be understood that my invention is applicable to other animals as well, including fur-bearing animals.

The ration for mink, as well as for other carnivorous fur-bearing animals, must contain the proper proportions of the basic foods, i.e., proteins, fats, carbohydrates, minerals and vitamins. The proportion for each may vary depending upon such factors as climate, time of year and the particular animal involved. The proper level of fresh, digestable fats is of great importance to the mink in obtaining a healthy, prolific and valuable mink, and the proportion of fat in the mink diet may vary from about 20 to 25%, on a dry basis. Fats are highly concentrated sources of energy and contain variable amounts of vitamins and unsaturated fatty acids. In addition, fats act as the vehicle for the fat-soluble vitamins, and as the medium from which these vitamins are absorbed by the animal body.

For this reason, it is standard practice with the mink farmer or rancher to supplement the mink ration with fats. The fats generally used for supplementing the ration are processed fats such as lard or tallow, but fish oil might also be employed. In addition, horsemeat fat, chicken fat, tripe fat and/or lung fat might be employed.

Incorporating fats with the ration presents a number of problems. For example, fats used in the ration supplement are normally a solid or semisolid at room temperature, and consequently cannot be added readily to the cold ingredients of the ration so as to be uniformly dispersed in the ration. Further, because the fats employed are normally a solid or semisolid at room temperature, the fats must first be melted. This type of fat has a tendency to stick to the feeding troughs thereby causing serious cleaning problems which might readily introduce a source of contamination leading to the chance of serious diseases among the mink. When the melted fats are added to the cold feed, the fats have a tendency to coagulate or "ball up." This results in a non-uniform mixture of feed and is detrimental to the palatability of the feed. Because mink are finical eaters, these factors can be detrimental to their appetite thereby causing the mink to go "off feed" which impairs their growth and fur-bearing value and even causes death.

The purpose of this invention, therefore, is to provide a fat supplement for the feed ration having none of the foregoing disadvantages and which is readily dispersable in the ration.

In accordance with the present invention, I provide a fat supplement for the mink ration comprising fat, an alkylene glycol, an emulsifier for the fat and water. The fat supplement is formed as a homogeneous emulsion which can be readily admixed or dispersed with the mink ration.

The fats employed in the supplement may be any of the edible animal and vegetable fats and oils which are normally a solid or semisolid at room temperature. This may include saturated and unsaturated fats. Examples of suitable fats are lard, tallow, soybean oil, corn oil and the like. However, lard and tallow are economically more desirable.

The quantity of fat employed in the supplement will vary depending primarily upon the degree to which the feed ration needs to be supplemented by fat. As explained above, however, the fat content for the mink ration is generally in the range of 20 to 25%, on a dry basis. For purposes of this invention, the fat content of the supplement would normally run not more than about 70%, by weight, and usually in the range of 30 to 70%, but more or less might be employed depending upon the particular need for the animal. Usually preparing a supplement much below 40% may be of lesser economic value, in that the quantity of fats added to the ration is too low in proportion to the total supplement. On the other hand, there is generally no need to employ more than 70% fats in the supplement. In addition, I have found that an emulsion is not too readily formed with quantities much higher than 70%. It is preferred to employ a fat content of from about 50 to 70%, by weight, in the supplement.

The alykylene glycol is an effective antibacterial preservative. The bacteria present in the foods employed in the ration degrade the food rapidly and thereby can cause disease among the mink. This is primarily true in protein which constitutes a high percentage of the ration. By employing the alkylene glycol, the food can be maintained in a fresh condition over a considerably longer period of time than without the use of alkylene glycol thereby eliminating the need for feeding several times daily, which may be especially important in warmer weather. In addition, the alkylene glycol serves as an antifreeze which prevents the supplement from freezing during the cold weather and further facilitates dispersion of the supplement in the ration.

The alkylene glycols employed should be non-toxic and normally liquid at room temperature and atmospheric pressure. Preferably, those which might be employed include the lower molecular weight alkylene glycols having from two to five carbon atoms per molecule, for example, ethylene glycol, propylene glycol and butylene glycol. For purposes of this invention, propylene glycol has been found particularly desirable from an economical standpoint as well as from a functional standpoint particularly in view of its non-toxic property.

It has been found that from about 10% to 30% alkylene glycol, by weight, should be employed in the food supplement. Quantities less than 10% generally are not suitably effective as an antibacterial preservative, nor do such lower quantities provide sufficient antifreeze properties. However, generally there is no need to employ more than 30% alkylene glycol, although the optimum quantity of glycol employed will vary somewhat depending primarily upon the quantity of fat in the supplement. In the preferred embodiment of my invention, about 20 to 25% propylene glycol is used.

As mentioned above, the fat supplement is prepared as an emulsion which is incorporated into the ration. For this purpose, the fat is emulsified with a suitable emulsifying chemical agent. Suitable emulsifying chemical agents include for example, the sorbitan esters of fatty acids such as sorbitan monolaurate, sorbitan monopalmitate, sorbitan monostearate and sorbitan monooleate, polyoxyethylene sorbitan esters of fatty acids and mixed fatty acids containing from about 2 to about 40 oxyethylene groups, such as polyoxyethylene sorbitan monolaurate, polyoxyethylene sorbitan monostearate, polyoxyethylene sorbitan monooleate, polyoxyethylene sorbitan oleate-stearate. Also, the monoglycerides, soap stearates and higher fatty alcohol emulsifying agents can be used. The preferred emulsifier has been found to be polyoxyethylene sorbitan monooleate. Other materials may be used to supplement or modify the above described emulsifiers. For instance carboxy methyl cellulose or Avicel (a magnesium oxide based material) may be used as thickeners. Lecithin also may be used to supplement the emulsifiers set forth above.

The proper quantity of chemical emulsifying agent employed in preparing the fat supplement is dependent primarily upon the quantity of fat used and the type of fat, and may be readily determined by experiment. However, it is economical to employ a minimum amount of emulsifying agent, but there must be sufficient quantity present to sufficiently emulsify the fat and form a uniform material. I have found that about 1 to 5%, by weight, emulsifying chemical agent is suitable for the amount of fat employed in the supplement and preferably about 2 to 4%. Quantities greater than 5% generally are not necessary nor desirable in that no additional benefit is received from a larger quantity and the larger quantity is not economical.

In order to facilitate the process of forming the fat supplement, as well as to render the product more economical, the fat supplement is formed as an aqueous mixture. The water is generally admixed first with the alkylene glycol with which it is entirely miscible. The quantity of water employed can vary depending upon a number of factors. For example, where the ration containing the fat supplement is used in the relatively warmer weather, or in a warmer climate, whereby it is necessary to employ a relatively higher percentage of alkylene glycol as an antibacterial preservative, the amount of water may be low. Also, when a ration containing the fat supplement is employed in cold weather, or in a cold climate, the amount of water might be decreased where it is necessary to use an increased quantity of alkylene glycol as an antifreeze. The quantity of water will depend also upon the type and amount of emulsifying agent used. I have found that generally from about 8 to 30% water, by weight, is satisfactory, and in the preferred embodiment, about 10 to 15% water.

In preparing the fat supplement, the water is admixed with the alkylene glycol. About one-half of the emulsifying agent is then added to the water-glycol mixture, and this final mixture is brought to a temperature of at least 100° F., and preferably of from about 100 to 140° F. The remaining one-half of the emulsifying agent is then admixed to the fat, and this mixture is likewise brought to a temperature of at least 100° F., and preferably of from about 100 to 140° F. The water-glycol mixture containing a portion of the emulsifying agent is then added to the fat having a portion of the emulsifying agent. The material is thoroughly admixed by a mechanical mixer or the like, and then homogenized with a suitable blender type or pressure type homogenizer. Pressure type homogenization is more effective in making a fine emulsion, and desirably pressures at about 500 to 2000 pounds per square inch are used, and more typically about 1500 pounds. A suitable homogenizer used in preparing the fat supplement is a standard dairy homogenizer such as the Cherry-Burell homogenizer. However, other types of homogenizers may be employed, such as Gaulin and Manton-Gaulin homogenizers. The components are mixed and homogenized at a minimum temperature of 100° F., and preferably 100 to 135° F., to facilitate homogenization. However, there is generally no need to use temperatures beyond 135° F., and higher temperatures may be undesirable in that the fat may soften or melt or may cause vaporization. A preferred temperature of about 110° F. is particularly desirable for working with the components of the fat supplement within the proportions described.

The fat supplement formed in accordance with this invention is a water in fat emulsion, and the fat is the external phase. The rancher further dilutes the fat supplement with water just prior to incorporating it into the feed ration, and the emulsion inverts to an oil in water emulsion. The quantity of fat supplement then incorporated into the feed ration depends upon the particular nutritional requirements for the animal.

The invention is illustrated by one specific example which has been found to be particularly desirable with a typical mink ration. The fat supplement comprises:

| | Percent by weight |
|---|---|
| Fats (tallow or lard) | 60 |
| Propylene glycol | 25 |
| Water | 12 |
| Polyoxyethylene (20) sorbitan monooleate | 3 |

This supplement was prepared in accordance with the method described above. The fat supplement of this invention is particularly useful in typical rations containing meat, fish, poultry, digested eggs and other proteinous materials in combination with the other constituents of the ration such as tripe, cereal, bone, etc.

Where desired, the fat supplement may be further enriched with a wide variety of vitamins and proteins. In this modification, both water soluble vitamins, such as $B_1$, $B_2$ and C vitamins, and oil soluble vitamins, such as A, $D_2$ and E vitamins, may be added to the supplement before the homogenization step in the process. The vitamins are dissolved in the appropriate phase of the supplement, and therefore these micronutrient essential products are uniformly dispersed and are in a form more readily absorbed biologically. Proteins, such as egg proteins or lacto albumin, may be added to the water phase in the preparation of the supplement. In this manner, as much as 10% by weight of protein may be uniformly dispersed in the emulsion.

The fat supplement having the above designated combination of constituents, and prepared in the manner described, can be added readily to all types of feed mixtures or rations and can be dispersed uniformly throughout the ration. As a further significant advantage, since the fat supplement is an emulsion, it is more readily assimilated or absorbed by the body than ordinary fat. Moreover, as pointed out above, the food can be preserved over a longer period of time, which is especially valuable in warmer weather, thereby eliminating several feeding times in any one day. In addition, the fat supplement incorporated into the ration does not stick to the feeding trough thereby eliminating any special cleaning problems.

This product also is desirable as a cattle supplement, because the high quantity of fat renders it useful as a calf milk replacer, and the propylene glycol would tend to prevent and cure ketosis.

Having described my invention, and certain embodiments thereof, I claim:

1. A method for preparing a fat supplement for feed rations for animals, said supplement containing from about 30 to 70% of an edible fat, from about 10 to about 30% of a non-toxic alkylene glycol, from about 1 to about 5% of an emulsifying agent and from about 8 to about 30% of water, said percentages being by weight, said method comprising forming an aqueous mixture of said non-toxic alkylene glycol and water, adding a portion of said emulsifying agent to said mixture of water and said glycol, admixing the remaining portion of said emulsifying agent with said edible fat, admixing the water-glycol mixture with the fat mixture at a temperature between about 100° F., and 140 F. and then homogenizing the mixture at a pressure of about 500 to 2000 pounds per square inch.

2. The method according to claim 1 wherein said alkylene glycol is propylene glycol.

3. A method for preparing a fat supplement for feed rations for animals comprising forming an aqueous mixture of propylene glycol and water, adding about one-half of the total amount used of an emulsifying agent to said mixture water and propylene glycol, adding the remaining portion of an emulsifying agent to an edible fat, admixing the water-propylene glycol mixture with the fat mixture at a temperature of from at least 100° F. to 140° F. and then homogenizing the mixture at a pressure of about 500 to 2000 pounds per square inch and at a temperature of from 100° to 135° F., said fat supplement containing from about 30% to about 70% fat, about 10 to 30% propylene glycol, about 1 to 5% emulsifying agent and about 8 to 30% water, said amounts being by weight.

4. The method according to claim 3 wherein water soluble vitamins and fat soluble vitamins are incorporated with the resulting admixture of water, propylene glycol and fat mixture prior to said homogenizing step.

5. The method according to claim 3 wherein up to 10% by weight of protein food is incorporated prior to said homogenizing step.

References Cited

UNITED STATES PATENTS

| 2,703,285 | 3/1955 | Luther | 99—7 |
| 2,793,952 | 5/1957 | Rawlings | 99—7 |
| 2,906,626 | 9/1959 | Eagon et al. | 99—140 |
| 3,248,224 | 4/1966 | Loomis et al. | 99—6 |

FOREIGN PATENTS

| 828,312 | 2/1960 | England. | |

A. LOUIS MONACELL, Primary Examiner

R. M. ELLIOTT, Assistant Examiner

U.S. Cl. X.R.

99—7, 118